(12) United States Patent
Ylinen et al.

(10) Patent No.: US 12,346,734 B2
(45) Date of Patent: Jul. 1, 2025

(54) METRICS AND SECURITY-BASED ACCELERATOR SERVICE RESCHEDULING AND AUTO-SCALING USING A PROGRAMMABLE NETWORK DEVICE

(71) Applicant: Intel Corporation, Santa Clara, CA (US)

(72) Inventors: Mikko Ylinen, Lempaala (FI); Ismo Puustinen, Helsinki (FI); Reshma Lal, Portland, OR (US); Soham Jayesh Desai, Rochester, MN (US)

(73) Assignee: INTEL CORPORATION, Santa Clara, CA (US)

( * ) Notice: Subject to any disclaimer, the term of this patent is extended or adjusted under 35 U.S.C. 154(b) by 748 days.

(21) Appl. No.: 17/482,155

(22) Filed: Sep. 22, 2021

(65) Prior Publication Data
US 2022/0012095 A1    Jan. 13, 2022

(51) Int. Cl.
*G06F 9/50* (2006.01)
*G06F 9/48* (2006.01)
(Continued)

(52) U.S. Cl.
CPC ............ *G06F 9/505* (2013.01); *G06F 9/4843* (2013.01); *G06F 21/53* (2013.01); *H04L 9/085* (2013.01);
(Continued)

(58) Field of Classification Search
CPC ......... G06F 9/505; G06F 9/4843; G06F 21/53
See application file for complete search history.

(56) References Cited

U.S. PATENT DOCUMENTS

2019/0132136 A1* 5/2019 Scarlata ................ H04L 9/0891
2020/0142753 A1* 5/2020 Harwood .............. G06F 9/4856
(Continued)

FOREIGN PATENT DOCUMENTS

CN    115934307 A    4/2023
JP    2023046248 A   4/2023

OTHER PUBLICATIONS

Dierling, Kevin. "What is a DPU?" (Year: May 20, 2020).*
(Continued)

*Primary Examiner* — Lewis A Bullock, Jr.
*Assistant Examiner* — Carlos Alberto Espana
(74) *Attorney, Agent, or Firm* — JAFFERY WATSON HAMILTON & DESANCTIS LLP

(57) ABSTRACT

An apparatus to facilitate metrics and security-based accelerator service rescheduling and auto-scaling using a programmable network device is disclosed. The apparatus includes processors to collect metrics corresponding to communication links between microservices of a service managed by a service mesh; determine, based on analysis of the metrics, that a workload of the service can be accelerated by offload to a hardware accelerator device; generate a scaling request to cause the hardware accelerator device to be allocated to a cluster of hardware devices configured for the service; cause the scaling request to be transmitted to a programmable network device managing the hardware accelerator device, the programmable network device to allocate the hardware accelerator device to the cluster and to register the hardware accelerator device with the service mesh; and schedule the workload of the service to the hardware accelerator device.

19 Claims, 7 Drawing Sheets

(51) Int. Cl.
  *G06F 21/53*  (2013.01)
  *H04L 9/08*   (2006.01)
  *H04L 9/40*   (2022.01)
(52) U.S. Cl.
  CPC .......... *H04L 63/0428* (2013.01); *H04L 63/08* (2013.01); *G06F 2209/505* (2013.01); *G06F 2209/509* (2013.01); *G06F 2221/2149* (2013.01)

(56) References Cited

U.S. PATENT DOCUMENTS

| | | | |
|---|---|---|---|
| 2020/0296172 A1* | 9/2020 | Gunjal | H04L 43/16 |
| 2021/0064740 A1* | 3/2021 | Hanel | G06F 9/4881 |
| 2021/0103468 A1* | 4/2021 | Wang | G06F 9/5044 |
| 2022/0012095 A1 | 1/2022 | Ylinen et al. | |
| 2022/0100566 A1 | 3/2022 | Ylinen et al. | |

OTHER PUBLICATIONS

Extended European Search Report, EP Application No. 22186209.7, Jan. 2, 2023, 16 pages, EPO.
Notification of European Publication Number, EP Application No. 22186209.7, Mar. 1, 2023, 2 pages, EPO.

\* cited by examiner

500

```
Collect, by an XPU scheduler extender, metrics corresponding to
communication links between micro services of a service managed by a
service mesh
                                                                      510
```

↓

```
Determine, based on analysis of the metrics by the XPU scheduler extender,
that a workload of the service can be accelerated by offload to an XPU
hardware accelerator device
                                                                      520
```

↓

```
Generate, by the XPU scheduler extender, a scaling request to cause the
XPU hardware accelerator device to be allocated to a cluster of hardware
devices configured for the service
                                                                      530
```

↓

```
Cause, by the XPU scheduler extender, the scaling request to be transmitted
to a programmable network device managing the XPU hardware accelerator
device, the programmable network device to allocate the XPU hardware to
the cluster and to register the XPU hardware accelerator device with the
service mesh
                                                                      540
```

↓

```
Schedule the workload of the service to the XPU hardware accelerator device
                                                                      550
```

```
┌─────────────────────────────────────────────────────────────┐
│ Identify an XPU hardware accelerator device for inclusion in a │
│ cluster of hardware devices configured for a service of a      │
│ service mesh                                                   │
│                                                         610    │
└─────────────────────────────────────────────────────────────┘
                              ▼
┌─────────────────────────────────────────────────────────────┐
│ Validate the authenticity of the XPU hardware accelerator      │
│ device using an attestation protocol                           │
│                                                         620    │
└─────────────────────────────────────────────────────────────┘
                              ▼
┌─────────────────────────────────────────────────────────────┐
│ Establish a shared secret key with the XPU hardware            │
│ accelerator device                                             │
│                                                         630    │
└─────────────────────────────────────────────────────────────┘
                              ▼
┌─────────────────────────────────────────────────────────────┐
│ Communicate the shared secret key to a control plane           │
│ scheduler of the service mesh to utilize in scheduling         │
│ workloads of the service to the XPU hardware accelerator       │
│ device                                                         │
│                                                         640    │
└─────────────────────────────────────────────────────────────┘
```

*FIG. 6*

METRICS AND SECURITY-BASED ACCELERATOR SERVICE RESCHEDULING AND AUTO-SCALING USING A PROGRAMMABLE NETWORK DEVICE

FIELD

Embodiments relate generally to data processing and more particularly to metrics and security-based accelerator service rescheduling and auto-scaling using a programmable network device.

BACKGROUND OF THE DESCRIPTION

Disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

In a disaggregated computing environment, a typical worker node in a compute cluster can handle hundreds of container workloads at the same time. These worker nodes may also have statically-attached specialized hardware accelerators optimized for compute intensive tasks. For instance, a class of hardware accelerators can be optimized to efficiently run cryptography and compression algorithms, such as Transport Layer Security (TLS) or zlib, respectively. However, the static hardware accelerator resources are typically not available for every workload running on a worker node due to the scarcity of the resources. In order to accelerate compute-heavy operations in a meaningful way, the hardware accelerator resources cannot be spread too thin to ensure quality of service (QoS).

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 5 is a flow diagram illustrating an embodiment of a method for metrics and security-based accelerator service rescheduling and auto-scaling using a programmable network device.

FIG. 6 is a flow diagram illustrating an embodiment of a method for security provisions while implementing metrics and security-based accelerator service rescheduling and auto-scaling using a programmable network device.

DETAILED DESCRIPTION

Figure 1:
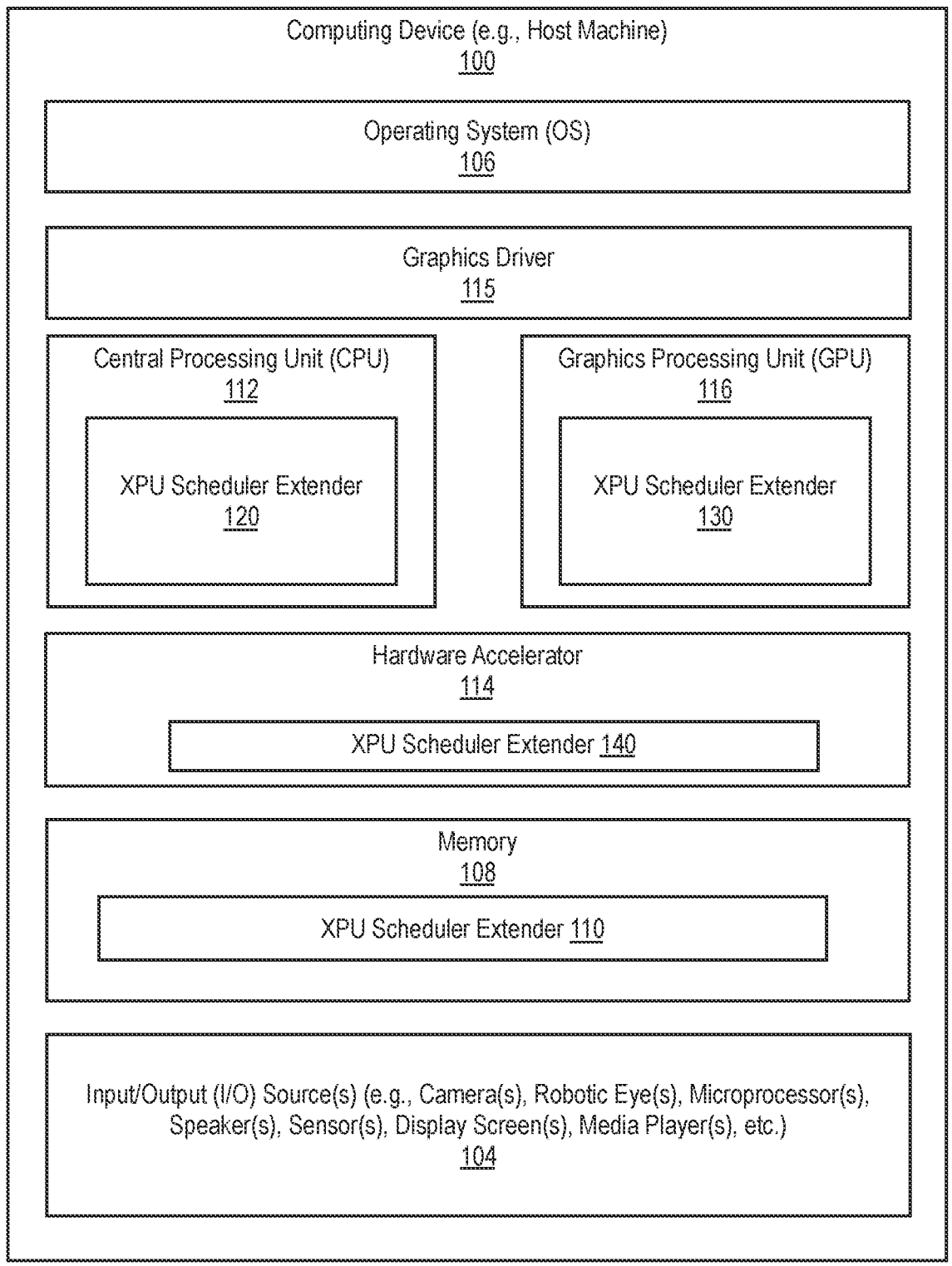
FIG. 1 illustrates a computing device employing a XPU scheduler extender for providing metrics and security-based accelerator service rescheduling and auto-scaling using a programmable network device, according to implementations of the disclosure.

Implementations of the disclosure describe metrics and security-based accelerator service rescheduling and auto-scaling using a programmable network device. Cloud service providers (CSP) are deploying solutions in datacenters where processing of a workload is distributed on disaggregated compute resources, such as central processing units (CPUs), graphics processing units (GPUs), and/or hardware accelerators (including, but not limited to, field programmable gate arrays (FPGAs) or application-specific integrated circuits (ASICs)), that are connected via a network (instead of being on the same platform and connected via physical links such as peripheral component interconnect express (PCIe)). Disaggregated computing enables improved resource utilization and lowers ownership costs by enabling more efficient use of available resources. Disaggregated computing also enables pooling a large number of hardware accelerators for large computation making the computation more efficient and better performing.

Service providers and enterprises are investing heavily in hyper-scale data centers to deliver efficient compute for cloud native applications and micro-services. The applications delivering these services should have access to high-speed, low latency storage and a secure networking infrastructure. Disaggregated computing solutions can provide such high-speed, low latency storage and a secure networking infrastructure. However, infrastructure services such as virtual switching, security, and storage can consume a significant number of CPU cycles.

A programmable network device can be utilized to accelerate network infrastructure, freeing up CPU cores for improved application performance. Programmable network devices may include, for example, Infrastructure Processing Units (IPUs), Data Processing Units (DPUs), smart network interface cards (SmartNICs). The discussion herein may specifically refer to programmable network devices as IPUs, but is not intended to limit programmable network devices to such an implementation and may encompass other implementations of programmable network devices. Programmable network devices, such as IPUs, enable cloud service providers to customize infrastructure function deployments at the speed of software, while improving data center utilization by allowing for flexible workload placement. Programmable network devices can intelligently manage system-level resources by securely accelerating networking and storage infrastructure functions in a data center.

Datacenters with disaggregated computing can further leverage a microservice architecture to provide for accelerate network infrastructure services. A microservice architecture can arrange an application as a collection of loosely-coupled microservices, which can refer to processes that communicate over a network to fulfill a goal using technology-agnostic protocols, such as HTTP or gRPC. In some cases, the microservices may be deployed using a container orchestration platform providing containerized workloads and/or services. The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

In a disaggregated computing environment, a typical worker node in a compute cluster of a microservice architecture can handle hundreds of container workloads at the same time. These worker nodes may also have statically-attached specialized hardware accelerators optimized for compute intensive tasks. (As discussed herein, hardware accelerators may also be referred to variously as hardware accelerator devices, hardware accelerator resources, accelerator resources, or accelerator.) For instance, a class of hardware accelerators can be optimized to efficiently run cryptography and compression algorithms, such as Transport Layer Security (TLS) or zlib, respectively. However, the static hardware accelerator resources are typically not available for every workload running on a worker node due to the scarcity of the resources. In order to accelerate compute-heavy operations in a meaningful way, the hardware accelerator resources cannot be spread too thin to ensure quality of service (QoS).

In a related context, a control plane scheduler of the container orchestration platform (managing the microservice architecture) can observe the hardware accelerator virtual functions (VFs) as "extended resources". The number of available VFs on a given accelerator may be limited. For example, for a cryptographic accelerator card, there may be three physical accelerator engines which expose 16 VFs each, leading to 48 possible extended allocatable resources per node. The container applications of the microservice architecture may request one or more such accelerator resources, and after the accelerator resources of a node have run out, the control plane scheduler does not schedule workloads requesting such accelerator resources to the compute node (e.g., server CPU), even if the compute node has available compute resources. This may lead to underutilization of compute nodes.

In some cases, the container, while being able to benefit from the use of an accelerator resource, may also be able to run without it with tradeoffs such as reduced performance and higher CPU utilization, or may not be sensitive to which accelerator resource it gets (e.g., FPGA vs. GPU vs. ASIC, etc.). These cases cannot be handled efficiently by conventional solutions. Moreover, if the static cluster completely runs out of accelerator resources for a certain type, new workloads remain in a pending state until resources become free again. This results in increased latency and reduced performance of the microservice architecture.

Conventional approaches for scheduling for extended resources in a microservice architecture include the approach utilized by the control plane scheduler of a container orchestration platform, as follows. If a workload requests an extended resource, it is scheduled to a compute node that provides such a resource, and the available resource count on the node is decreased. The available resources on each node is static and this is reported to the control plane scheduler in the cluster during initialization. To overcome the limitation of workloads operating in a pending state, one conventional approach may provide an "infinite" number of virtual accelerator resources, and then have a subset of them contain actual accelerator hardware backend. However, this approach does not address the situation when all of the "actual" accelerator hardware backend resources are fully utilized.

Metrics-based scheduling in cloud orchestrators has not been used to deploy hardware accelerator resources in conventional approaches, especially to deploy XPU resources that might be disaggregated. XPU refers to heterogenous and/or cross-architecture ("X") processing units including hardware accelerators (e.g., CPUs, GPUs, FPGAs, ASICs, inference accelerators, cryptographic accelerators, other special-purpose hardware accelerators, etc.). For example, the Kubernetes project works on a workload "vertical autoscaler". The idea is to monitor workload's performance and dynamically add more CPU time and/or memory for the workload if the workload's performance becomes degraded. However, this approach focuses on increasing/decreasing native (CPU and memory) resources, and does not consider whether certain compute-intensive tasks could be offloaded to a dedicated accelerator (e.g., XPU) and/or co-processor.

Other container orchestrator service mesh solutions work by having a sidecar proxy alongside every container application. If such a sidecar proxy uses the hardware accelerator for common tasks, such as transport layer security (TLS) handshake acceleration or HyperText Transport Protocol (HTTP) compression, the static limit of 48 resources (continuing the example discussed earlier), causes the application limit to be 48 pods containing the sidecar proxy along with the application container. Thus, this scheduling mechanism contributes directly to the problem of running out of resources, resulting in workloads that have to wait for accelerator resources to free up before they can be scheduled.

Furthermore, if some of the granted resources are "empty" (i.e., do not contain a real hardware accelerator access), but are granted to enable scheduling of more than 48 applications, predictability is lost (e.g., no way to know if a service can fulfill the performance targets). In such a case, fully-optimized microservice graphs can observe bottlenecks in the flows, causing other hardware accelerator resources to be underutilized, because traffic volume is already cut at an earlier part of the microservice flow graph.

Implementations of the disclosure address the above-noted technical drawbacks by providing for metrics and security-based accelerator service rescheduling and autoscaling using a programmable network device. In implementations herein, techniques are provided to utilize workload telemetry data, programmable network devices (such as IPUs), and XPU (heterogenous processing units) hardware accelerators (e.g., CPUs, GPUs, FPGAs, ASICs, inference accelerators, cryptographic accelerators, other special-purpose hardware accelerators, etc.) to achieve scalable and more dynamic compute resource allocation to workloads benefiting from acceleration in a compute cluster.

Implementations provide an XPU scheduler extender and a cluster node agent that provide two usage models. In implementations herein, the XPU scheduler extender may also be referred to as a scheduler extender or scheduler extender circuitry. In the first usage model, the XPU scheduler extender communicates with a main cluster orchestrator and the cluster node agents to relay information about scaling the amount of XPU accelerator compute resources to the cluster. In the second usage model, the XPU scheduler communicates with the datacenter cluster node agents to configure more compute bandwidth to workloads already consuming XPU resources and/or switch the underlying XPU type for more efficient compute.

In implementations herein, the XPU scheduler extender collects and analyses metrics from the workloads. The metrics are something that can be mapped to functions that could also be accelerated on an XPU. For example, the number of TLS handshakes/second, or amount of data bytes compressed on CPU can be mapped to a cryptographic/compressor accelerator. Using metrics-based XPU scheduling, an optimized amount of XPU resources can be made available to the cluster and allocated to those workloads utilizing them and workloads not benefiting from them can be scheduled to run on CPU.

Implementations of the disclosure provide technical advantages over the conventional approaches discussed above. One technical advantage is that the XPU accelerator resources are better targeted as they are dynamically used to remove bottlenecks in the microservice flow graph and an optimized amount of XPU accelerators resources are implemented. Another technical advantage is that the XPU accelerator resources do not go to containers with so little usage that the resulting overhead would decrease application performance. A further technical advantage is that the nodes do not run out of XPU accelerator resources so easily as the maximum number of containers running on the node is no longer determined by the available accelerator resources (e.g., in the service mesh use case.)

FIG. 1 illustrates a computing device 100 employing a XPU scheduler extender 110 for providing metrics and security-based accelerator service rescheduling and autoscaling using a programmable network device, according to implementations of the disclosure. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment, self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SOC" or "SoC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), user-mode driver framework (UMDF), or simply "driver") 115, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be utilized for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, XPU scheduler extender 110 may be hosted by memory 108 in communication with I/O source(s) 104, such as microphones, speakers, etc., of computing device 100. In another embodiment, XPU scheduler extender 110 may be part of or hosted by operating system 106. In yet another embodiment, XPU scheduler extender 110 may be hosted or facilitated by graphics driver 115. In yet another embodiment, XPU scheduler extender 110 may be hosted by or part of a hardware accelerator 114; for example, XPU scheduler extender 110 may be embedded in or implemented as part of the processing hardware of hardware accelerator 114, such as in the form of XPU scheduler extender 140. In yet another embodiment, XPU scheduler extender 110 may be hosted by or part of graphics processing unit ("GPU" or simply graphics processor") 116 or firmware of graphics processor 116; for example, XPU scheduler extender may be embedded in or implemented as part of the processing hardware of graphics processor 116, such as in the form of XPU scheduler extender 130. Similarly, in yet another embodiment, XPU scheduler extender 110 may be hosted by or part of central processing unit ("CPU" or simply "application processor") 112; for example, XPU scheduler extender 110 may be embedded in or implemented as part of the processing hardware of application processor 112, such as in the form of XPU scheduler extender 120. In some embodiments, XPU scheduler extender 110 may be provided by one or more processors including one or more of a graphics processor, an application processor, and another processor, wherein the one or more processors are co-located on a common semiconductor package.

It is contemplated that embodiments are not limited to certain implementation or hosting of XPU scheduler extender 110 and that one or more portions or components of XPU scheduler extender 110 may be employed or implemented as hardware, software, or any combination thereof, such as firmware. In one embodiment, for example, the XPU scheduler extender may be hosted by a machine learning processing unit which is different from the GPU. In another embodiment, the XPU scheduler extender may be distributed between a machine learning processing unit and a CPU. In another embodiment, the XPU scheduler extender may be distributed between a machine learning processing unit, a CPU and a GPU. In another embodiment, the XPU scheduler extender may be distributed between a machine learning processing unit, a CPU, a GPU, and a hardware accelerator.

It is further contemplated that embodiments are not limited to certain implementation or hosting of XPU scheduler extender 110 and that one or more portions or components of XPU scheduler extender 110 may be employed or implemented in more than one computing device (e.g., host machine) 100 and is not solely limited to implementation in a single computing device 100.

Computing device 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
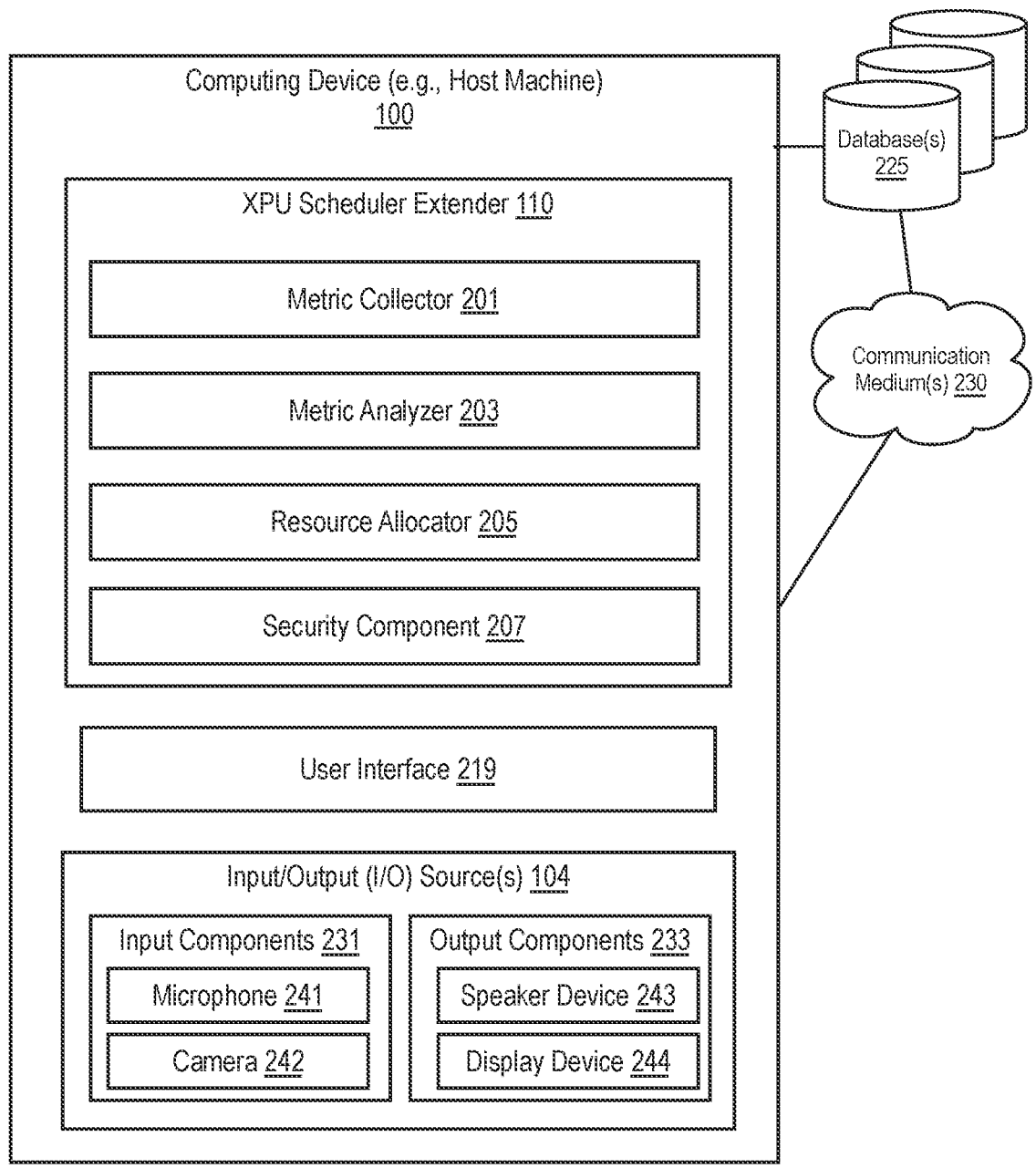
FIG. 2 illustrates the XPU scheduler extender of FIG. 1, according to one implementation of the disclosure.

FIG. 2 illustrates XPU scheduler extender 110 of FIG. 1, according to one implementation of the disclosure. For brevity, many of the details already discussed with reference to FIG. 1 are not repeated or discussed hereafter. In one embodiment, XPU scheduler extender 110 may be the same as any of XPU scheduler extenders 110, 120, 130, 140 described with respect to FIG. 1 and may include any number and type of components, such as (without limitations): metric collector 201; metric analyzer 203; resource allocator 205; and security component 207. It is contemplated that embodiments are not limited to certain implementation or hosting of metric collector 201, metric analyzer 203, resource allocator 205, and security component 207, and that one or more portions or components of metric collector 201, metric analyzer 203, resource allocator 205, and security component 207 may be employed or implemented in more than one computing device (e.g., host machine) 100 and they are not solely limited to implementation in a single computing device 100. For example, metric collector 201 and metric analyzer 203 may be hosted on multiple separate computing devices 100.

Computing device 100 is further shown to include user interface 219 (e.g., graphical user interface (GUI) based user interface, Web browser, cloud-based platform user interface, software application-based user interface, other user or application programming interfaces (APIs), etc.). Computing device 100 may further include I/O source(s) 104 having input component (s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or other details, and/or the like.

As aforementioned, computing device 100 may host I/O sources 104 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as XPU scheduler extender 120, XPU scheduler extender 130, and/or XPU scheduler extender 140 hosted by application processor 112, graphics processor 116, and/or hardware accelerator 114, respectively, of FIG. 1 having to facilitate or execute the corresponding logic to perform certain tasks.

For example, as illustrated, input component (s) 231 may include any number and type of microphone(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

As previously described, approaches for scheduling for extended resources in a microservice architecture have not been used to deploy hardware accelerator resources in a disaggregated environment in conventional approaches, especially to deploy XPU resources that might be disaggregated. The conventional approaches also have encountered latency and performance issues with over-utilized hardware resources. Embodiments provide for a novel technique for metrics and security-based accelerator service rescheduling and auto-scaling using a programmable network device. This novel technique is used to address the above-noted latency and/or performance issues in computing architectures seeking to implement disaggregated XPU hardware accelerator resources in a microservices architecture. Implementations of the disclosure utilize an XPU scheduler extender 110 to provide the metrics and security-based accelerator service rescheduling and auto-scaling using a programmable network device.

With respect to FIG. 2, the XPU scheduler extender 110 includes metric collector 201; metric analyzer 203; resource allocator 205; and security component 207 to perform the metrics and security-based accelerator service rescheduling and auto-scaling of the XPU scheduler extender 110. In implementations of the disclosure, the operations of units 201, 203, 205, 207 of XPU scheduler 110 utilize workload telemetry data, programmable network devices (such as IPUs), and XPU (heterogenous processing units) hardware accelerators (e.g., CPUs, GPUs, FPGAs, ASICs, inference accelerators, cryptographic accelerators, other special-purpose hardware accelerators, etc.) to achieve scalable and dynamic compute resource allocation to workloads benefiting from acceleration in a compute cluster, such as a microservices architecture implemented in a disaggregated compute environment.

Implementations provide the XPU scheduler extender 110, in communication with a cluster node agent(s) (not shown) that provide two usage models. In the first usage model, the XPU scheduler extender 110 communicates with a main cluster orchestrator (not shown) and the cluster node agent(s) to relay information about scaling the amount of XPU accelerator compute resources to the cluster. In the second usage model, the XPU scheduler extender 110 communicates with the cluster node agent(s) to configure more compute bandwidth to workloads already consuming XPU accelerator resources and/or switch the underlying XPU type for more efficient compute.

In implementations herein, the metric collector 201 and metric analyzer 203 of XPU scheduler extender 110 collects and analyze metrics from service workloads. The metrics are telemetry data that can be mapped to functions that could be accelerated on an XPU accelerator resource. For example, the metrics of the number of TLS handshakes/second, or amount of data bytes compressed on CPU, can be mapped to a cryptographic/compressor accelerator by resource allocator 205. Using metrics-based XPU scheduling, an optimized amount of XPU resources can be made available to the cluster and allocated to those workloads utilizing them and workloads not benefiting from them can be scheduled to run on CPU. Security component 207 of XPU scheduler extender 110 operates to provide authentication and secure communications with any XPU accelerator resources scheduled for the cluster by the resource allocator 205.

Further details of the metric collector 201; metric analyzer 203; resource allocator 205; and security component 207 are described below with respect to FIGS. 3-4.

Figure 3:
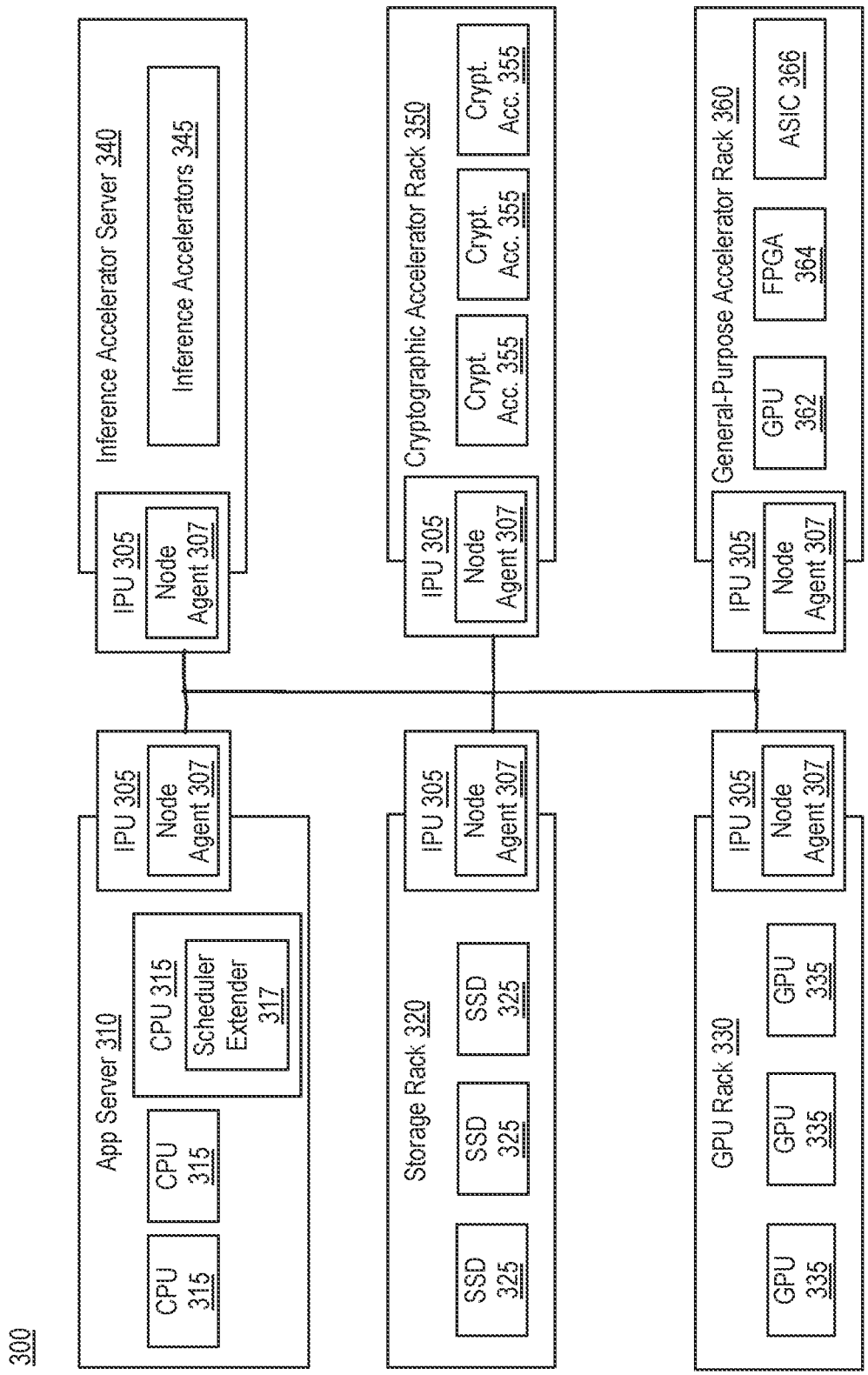
FIG. 3 illustrates a datacenter system that provides metrics and security-based accelerator service rescheduling and auto-scaling using a programmable network device, in accordance with implementations of the disclosure.

FIG. 3 illustrates a datacenter system 300 that provides metrics and security-based accelerator service rescheduling and auto-scaling using a programmable network device, in accordance with implementations of the disclosure. Datacenter system 300 illustrates an example data center (for example, hosted by a cloud service provider (CSP)) providing a variety of XPUs (heterogeneous processing units) for processing tasks at the datacenter, where an XPU can include one or more of: a central processing unit (CPU) 315, a graphics processing unit (GPU) 335 (including a general purpose GPU (GPGPU), ASICs, or other processing units (e.g., accelerators 345, 355, 366, inference accelerators 345, cryptographic accelerators 355, programmable or fixed function FPGAs 364, application-specific integrated circuit (ASICs) 366, compression accelerators, and so on). The datacenter may also provide storage units for data storage tasks, as well. The storage units may include solid state drive (SSD) 325, for example. The XPUs and/or storage units may be hosted with similar-type units (e.g., CPUS 315 hosted on an application server 310, SSDs 325 hosted on a storage rack 320, GPUs 335 hosted on a GPU rack 330, inference accelerators 345 hosted on an inference accelerator server 340, cryptographic accelerators 355 hosted on a cryptographic accelerator rack 350, and general-purpose accelerators 362, 364, 366 hosted on accelerator rack 360).

The datacenter of system 300 provides its hosted processing components 315, 325, 335, 345, 355, 362, 364, 366 with a variety of offloads using, for example, IPUs 305 that are directly attached to the respective host processing component. Although IPUs 305 are discussed for example purposes, other programmable network devices, such as DPUs or SmartNICs, may be used interchangeable for IPUs 305 herein. The offloads provided may be networking, storage, security, etc. This allows the processing components 315, 325, 335, 345, 355, 362, 364, 366 to run without a hypervisor, and provides CSPs the capability of renting out the entire host in a datacenter to their security-minded customers, or avoid cross-talk and other problems associated with multi-tenant hosts.

An IPU 305 can provide an important role in data centers by providing the datacenter operator, such as a Cloud Service Provider (CSP), a control point for security, acceleration, telemetry and service orchestration. IPU 305 architecture may build upon existing Smart Network Interface Card (SmartNIC) features and is a part of controlling security and data acceleration within and across distributed platforms. It is a secure domain controlled by CSPs for managing a platform, providing services to tenants, and securing access into the data center network. The IPU 305 increases the performance and predictability for distributed runtimes and enables scaling to multi-terabit throughputs by offloading host services, reliable transport, and optimizing data copies.

IPUs 305 have grown in complexity over the years, starting with foundational NICs, whose sole purpose was to get packets into the host and out of it. With the addition of networking software offload, the NICs evolved to become SmartNICs, that are capable of offloading functions, such as VSwitch, VIRTIO-Net, AVF, etc. Remote disaggregated storage architectures provide a further evolution, where compute and storage are not co-located anymore, but large compute clusters are connected to large storage clusters over the network. Increase in network speeds, and evolution of protocols made this a possibility. One of the advantages that remote disaggregated storage offers over direct attached storage is that compute and memory can be developed and updated at different cadences. The amount of memory that is attached to a compute node is not limited by physical addition or removal of hard-drives anymore, but can be hot-plugged as a PF to a PCIe Switch. Technologies such as Smart End Point enable IPUs to have firmware-controlled switches, along the PCIe Switch itself to not be limited by hardware implementations.

As discussed above, embodiments herein provide for metrics and security-based accelerator service rescheduling and auto-scaling using a programmable network device. Embodiments provide a scheduler extender 317 (also referred to as XPU scheduler extender herein) hosted by CPU 315, operating on the app server 310. In one implementation, scheduler extender 317 is the same as scheduler extender 110 described with respect to FIGS. 1 and 2. In one implementation, scheduler extender 317 collects and analyzes workload telemetry data (i.e., "metrics") corresponding to communication links between microservices of a service managed by a service mesh implemented in a container orchestration platform implemented in datacenter system 300. Based on the workload telemetry data, scheduler extender 317 works in tandem with programmable network devices (such as IPUs 305) to scale up or scale down XPU hardware accelerators (e.g., CPUs 315, GPUs 335 and 362, FPGAs 364, ASICs 366, inference accelerators 345, cryptographic accelerators 355, and/or other special-purpose hardware accelerators, etc.) to achieve scalable and more dynamic compute resource allocation to workloads benefiting from acceleration in a compute cluster of the datacenter system 300.

The scheduler extender 317 and one or more node agents 307 (also referred to herein as cluster node agents 307) can provide a multiple usage models for the metrics and security-based accelerator service rescheduling and auto-scaling described herein. In the first usage model, the scheduler extender 317 communicates with a main cluster orchestrator (now shown) and the node agents 307 to relay information about scaling the amount of XPU accelerator compute resources to the cluster. In the second usage model, the scheduler extender 317 communicates with the node agents 307 to configure more compute bandwidth to workloads already consuming XPU resources and/or switch the underlying XPU type for more efficient compute.

In implementations herein, the scheduler extender 317 collects and analyses metrics from the workloads. The metrics are telemetry data that can be mapped to functions that could also be accelerated on an XPU. For example, the number of TLS handshakes/second, or amount of data bytes compressed on CPU can be mapped to a cryptographic/compressor accelerator. Using metrics-based XPU scheduling, an optimized amount of XPU resources can be made available to the cluster and allocated to those workloads utilizing them and workloads not benefiting from them can be scheduled to run on CPU.

Figure 4:
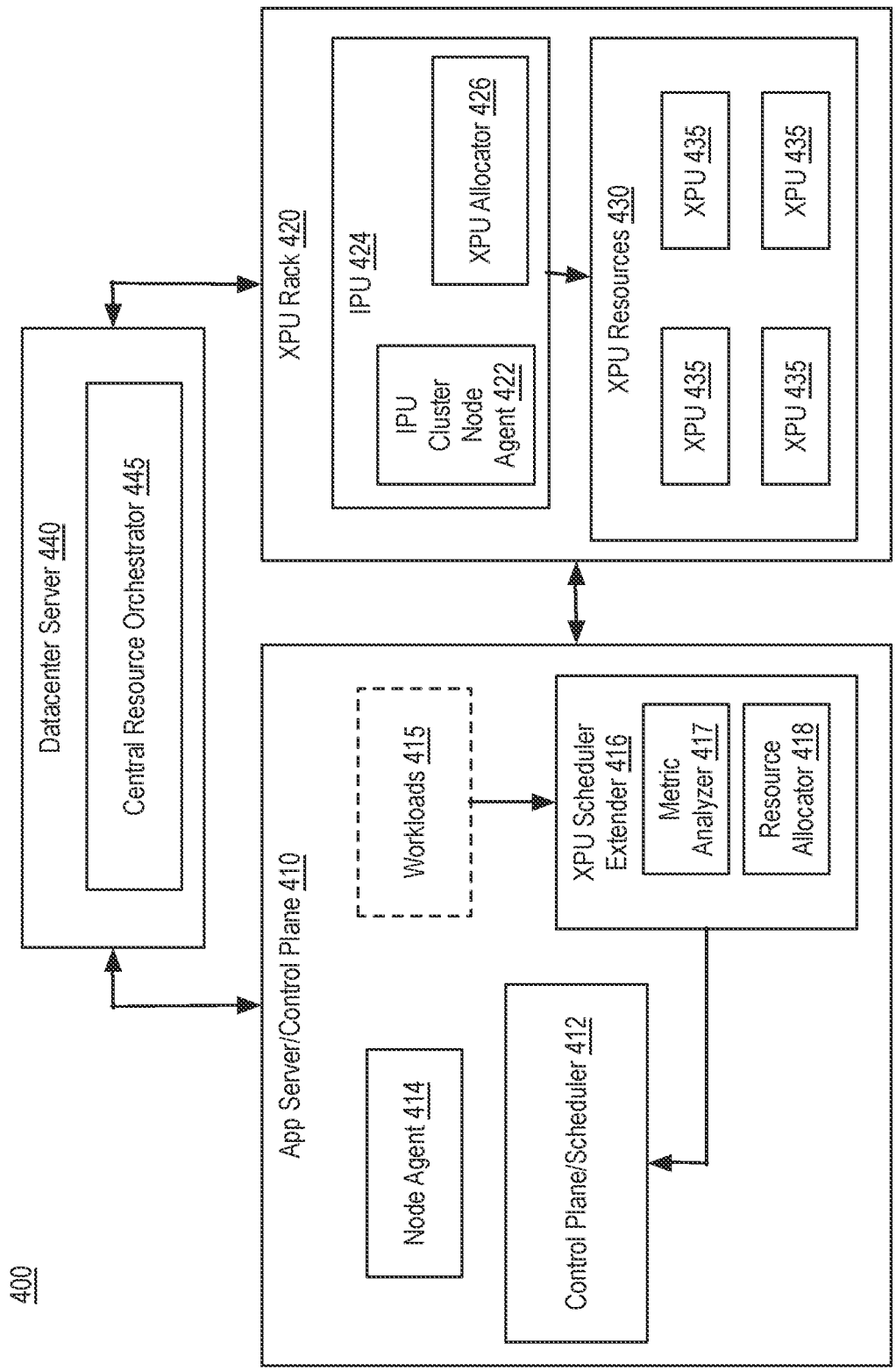
FIG. 4 depicts a block diagram of a datacenter system 400 implementing metrics and security-based accelerator service rescheduling and auto-scaling using a programmable network device, in accordance with implementations of the disclosure.

FIG. 4 depicts a block diagram of a datacenter system 400 implementing metrics and security-based accelerator service rescheduling and auto-scaling using a programmable network device, in accordance with implementations of the disclosure. In one embodiment, datacenter system 400 includes an application server/control plane 410, an XPU rack 420, and a datacenter server 440. In one implementation, application server/control plane 410 may be the same as app server 310 of FIG. 3, XPU rack 420 may be the same as any of storage rack 320, GPU rack 330, inference accelerator rack 340, cryptographic accelerator rack 350, and/or general-purpose accelerator rack 360 of FIG. 3, for example. Datacenter server 440 may be server computing device operating in datacenter system 400 to provide management and orchestration capabilities for the system 400.

In one embodiment, app server/control plane 410, XPU rack 420, and/or datacenter server 440 may be a computing device comprises a set of hardware, software, firmware elements and/or any combination of hardware, software and/or firmware elements. In one example, app server/control plane 410, XPU rack 420, and/or datacenter server 440 may include hardware circuitry, such as one or more of a CPU, a GPU, a hardware accelerator, and so on to execute one or more processes on app server/control plane 410, XPU rack 420, and/or datacenter server 440, as described herein.

In some embodiments, app server/control plane 410 includes a control plane scheduler 412, node agent 414, and an XPU scheduler extender 416. In one embodiment, control plane scheduler 412, node agent 414, and/or XPU scheduler extender 416 can be implemented in separate computing devices and are communicably coupled via a network (not shown). Control plane scheduler 412, node agent 414, and/or XPU scheduler extender 416 may be implemented using hardware circuitry, such as one or more of a CPU, a GPU, a hardware accelerator, and so on. In one embodiment, control plane scheduler 412, node agent 414, and/or XPU scheduler extender 416 may be implemented using computing system 100 described with respect to FIG. 1. In one implementation, XPU scheduler extender 416 is the same as XPU scheduler extender 110 described with respect to FIG. 1 and/or scheduler extender 317 described with respect to FIG. 3.

More generally, the example control plane scheduler 412, node agent 414, and/or XPU scheduler extender 416 of FIG. 4 may be implemented by hardware, software, firmware and any combination of hardware, software and/or firmware. Thus, for example, the example control plane scheduler 412, node agent 414, and/or XPU scheduler extender 416 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some embodiments, XPU rack 420 includes an IPU cluster node agent 422 running on an IPU 424, and XPU resources 430 including a plurality of XPUs 435. In one embodiment, IPU cluster node agent 422, IPU 424, and XPU resources 430 can be implemented in separate computing devices and are communicably coupled via a network (not shown). IPU cluster node agent 422, IPU 424, and XPU resources 430 may be implemented using hardware circuitry, such as one or more of a CPU, a GPU, a hardware accelerator, and so on. In one embodiment, IPU cluster node agent 422, IPU 424, and XPU resources 430 may be implemented using computing system 100 described with respect to FIG. 1. In one implementation, IPU cluster node agent 422 is the same as node agent 307 described with respect to FIG. 3, the IPU 424 is the same as IPU 305 described with respect to FIG. 3, and the XPU resources 430 and XPUs 435 are the same as any one of CPUs 315, GPUs 335 and 362, FPGAs 364, ASICs 366, inference accelerators 345, cryptographic accelerators 355, described with respect to FIG. 3.

More generally, the example IPU cluster node agent 422, IPU 424, and XPU resources 430 of FIG. 4 may be implemented by hardware, software, firmware and/or any combination of hardware, software and/or firmware. Thus, for example, the IPU cluster node agent 422, IPU 424, and XPU resources 430 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In one embodiment, datacenter server 440 includes a central resource orchestrator 445. Central resource orchestrator 445 may be implemented using hardware circuitry, such as one or more of a CPU, a GPU, a hardware accelerator, and so on. In one embodiment, central resource orchestrator 445 may be implemented using computing system 100 described with respect to FIG. 1.

More generally, the example central resource orchestrator 445 of FIG. 4 may be implemented by hardware, software, firmware and/or any combination of hardware, software and/or firmware. Thus, for example, the central resource orchestrator 445 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

As noted above, datacenter system 400 implements metrics and security-based accelerator service rescheduling and auto-scaling using a programmable network device, in accordance with implementations herein. As illustrated, datacenter system 400 may be implemented as a disaggregated compute environment, with XPU hardware rack 420 (including IPU 424) implemented separately from the app server/control plane 410 running a workload for an application. As illustrated, the control plane/scheduler 412, node agent(s) 414, and applications (e.g., workloads 415) run on the application servers (e.g., app server/control plane 410). By bringing metrics-based knowledge about the applications resource usage and the enhanced XPU aware scheduling capabilities provided by the XPU scheduler extender 416, as described herein, an improved XPU compute balance can be maintained in the datacenter system 400.

One example of embodiments herein includes a containerized web application that may be implemented in datacenter system 400. The web application is comprised of microservices, each of which is running in its own container using hardware resources of the datacenter system 400 (e.g., CPUs of app server/control plane 410 and/or XPU(s) 435 of XPU rack 420) and talking to other microservices using well known protocols such as HTTP or gRPC. In one implementation, TLS may be utilized for the communication links between the services.

Several tools, such as service meshes, allow fine-grained gathering of statistics for any given communication link between microservices. For example, a service mesh might report the number of new TLS connections to a given service or the number of transferred bytes per second. In one example, the metrics may indicate that there is a lot of traffic from an inventory service to the storefront service, maybe as a result of repeating queries of inventory data (e.g., dynamic traffic patterns are typical with modern web applications).

Implementations herein periodically rebalance XPU resources 430 based on collected metrics (e.g., telemetry data) and the known characteristics of the XPU accelerator devices (i.e., XPUs 435) available in the datacenter. XPU scheduler extender 416 may include a metric analyzer 417 to collect and analyze such metrics. The XPU scheduler extender 416 includes a resource allocator 418 to cause additional XPU resources 430, which are located on another platform and connected via network, can be dynamically scaled (e.g., added or removed) for purposes of processing a workload 415 of a service provided by app server/control plane 410.

In an example flow implemented by datacenter system 400, a particular microservice of a service is annotated as capable of utilize certain type of hardware accelerators by the developer of the service. Then, the metric analyzer 417 of the XPU scheduler extender 416 collects metrics and analyzes relevant metrics associated with the service in order to identify opportunities to provide acceleration for the service.

The metric analyzer 417 determines that the collected and analyzed metrics indicate that there is a potential to improving workload processing (e.g., query latency is improved if compression is accelerated), the resource allocator 418 of the XPU scheduler extender 416 provides the microservice another annotation (or a revised annotation), indicating that the microservice is a candidate to be scheduled in an XPU accelerator 435 of a certain type.

The resource allocator 418 also creates a scaling request to cause the XPU accelerator resource 435 to be prepared and made available. In one implementation, the scaling request may be sent to the central resource orchestrator 445 to cause the XPU 435 to be provisioned or updated. In one implementation, the XPU scheduler extender 416 may communicate directly with IPU 424 to cause XPU allocator 426 to allocate or update XPU 435 for purposes of handling workloads of the microservice. If the XPU accelerator resource 435 is remote to the app server/control plane 410, then the scaling request can be sent to the IPU virtual node agent 422 to which the XPU 435 is attached.

In one implementation, the XPU allocator 426 inside the IPU 424 can dynamically assigns the XPU 435 and the IPU 424 can register the XPU 435 with the app server/control plane 410. Depending on the rebalancing policy and the result of the scaling request, the service of the microservice can wait for the next restart of the service (e.g., maintenance break) or can be restarted automatically with the new XPU 435 dynamically added, for example.

Embodiments of the disclosure may not set any constraints to how a rebalancing/provisioning policy is created and/or implemented. For example, the rebalancing/provisioning policy can be based on a threshold value. In such an example, if traffic exceeds the pre-determined threshold amount or if there are over X amount of TLS handshakes per second, the service can be marked as a candidate for acceleration. However, the rebalancing/provisioning policy can also be complex and based on technologies such as neural networks, and the rebalancing/provisioning policy can be provided inputs as cluster-wide statistics. For example, the inputs can include informing the cluster utilization rate of hardware accelerator devices, expected future traffic patterns, and so on. The rebalancing/provisioning policies can be updated as more information about workload properties becomes available. A dynamic and adaptable policy for rebalancing and/or scheduling can be utilized herein for improved system resource utilization by implementations of the disclosure.

In one implementation, if the workload 415 is associated with security requirements and/or associated with security properties of the XPUs 435 (e.g., XPU 435 should be FIPs compliant or supports SPDM), then all communications with the XPU 435 should be protected. In one implementation, IPSec can be utilized as a solution to ensure that the new XPUs 435 added to the workload's cluster can comply by the requirements. The enforcement of the security policies can happen at the IPU 424, at the control plane/scheduler 412, or at both points.

For example, with respect to the enforcement at the IPU 424, the XPU scheduler extender 416 may convey the security requirements to the IPU 424 when submitting the XPU 435 scaling request. The XPU allocator 426 may then cause those XPUs 435 that comply with the security requirements to be available.

With respect to enforcement at the control plane/scheduler 412, the XPU scheduler extender 416 may provide the security policy to the control plane/scheduler 412. The IPU 424 can make the XPU 435 available, however, before the XPU 435 is registered, the control plane/scheduler 412 should verify the attestation of the XPU 435 to ensure compliance with the security policy. The service (e.g., workload 415) can be scheduled with acceleration when there is compliance with the security policy. If there is a requirement for secure communication with the XPU 435, the control plane/scheduler 412 and/or the XPU scheduler extender 418 may establish secure channels with the XPU before scheduling acceleration of the workloads 415 via the XPU 435.

In one implementation, the XPU scheduler extender 416, which collects and analyzes the metrics, can provide assurances that the metrics are not to be used for malicious intent, such as side channel attacks on the workload 415. This can be accomplished by executing the XPU scheduler extender 416 inside a trusted execution environment (TEE), such as Intel® SGX™, AMD™ SEV™, or Trustzone™, for example. Communication between the worker node (e.g., a CPU at app server/control plane 410) and XPU 435 is also protected over the network using security technologies, such as IPsec.

In some implementations, clusters may also be used to run regular batch jobs that can benefit from XPU 435 acceleration. It may be that these batch jobs can be completed regardless of what type of XPU 435 is used for acceleration (e.g., a compression batch job implemented using FPGA or a dedicated ASIC). In this case, the telemetry-based scheduling and/or scaling can be utilized to identify an XPU 435 to schedule the service based on, for example, the past performance history, environmental conditions (e.g., cluster power budget), or other service level agreements (SLAs). Another feature of implementations herein may include support for removing XPU(s) 435 from processing workloads if another workload may benefit the particular XPU(s) 435 more (e.g., to make the web application more performant), while ensuring there is limited disruption to the application.

FIG. 5 is a flow diagram illustrating an embodiment of a method 500 for metrics and security-based accelerator service rescheduling and auto-scaling using a programmable network device. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing an XPU scheduler extender, such as XPU scheduler extender 416 of datacenter system 400 of FIG. 4, may perform method 500.

The example process of method 500 of FIG. 5 begins at block 510 where a processing device executing an XPU scheduler extender may collect metrics corresponding to communication links between microservices of a service managed by a service mesh. Then, at block 520, the processing device may determine, based on analysis of the metrics by the XPU scheduler extender, that a workload of the service can be accelerated by offload to an XPU hardware accelerator device (also referred to herein as a hardware accelerator device).

Subsequently, at block 530, the processing device may generate, by the XPU scheduler extender, a scaling request to cause the XPU hardware accelerator device to be allocated to a cluster of hardware devices configured for the service. At block 540, the processing device may cause, by the XPU scheduler extender, the scaling request to be transmitted to a programmable network device managing the XPU hardware accelerator device. In one implementation, the programmable network device is to allocate the XPU hardware accelerator device to the cluster and to register the XPU hardware accelerator device with the service mesh.

Lastly, at block 550, the processing device may schedule the workload of the service to the XPU hardware accelerator device.

FIG. 6 is a flow diagram illustrating an embodiment of a method 600 for security provisions while implementing metrics and security-based accelerator service rescheduling and auto-scaling using a programmable network device. Method 600 may be performed by processing logic that may comprise hardware (e.g., circuitry, dedicated logic, programmable logic, etc.), software (such as instructions run on a processing device), or a combination thereof. More particularly, the method 600 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-5 may not be repeated or discussed hereafter. In one implementation, a datacenter system implementing an XPU scheduler extender, such as XPU scheduler extender 416 of datacenter system 400 of FIG. 4, may perform method 600.

The example process of method 600 of FIG. 6 begins at block 610 where the processing device may identify an XPU hardware accelerator device for inclusion in a cluster of hardware devices configured for a service of a service mesh. Then, at block 620, the processing device may validate the authenticity of the XPU hardware accelerator device using an attestation protocol.

Subsequently, at block 630, the processing device may establish a shared secret key with the XPU hardware accelerator device. Lastly, at block 640, the processing device may communicate the shared secret key to a control plane scheduler of the service mesh to utilize in scheduling workloads of the service to the XPU hardware accelerator device.

Figure 7:
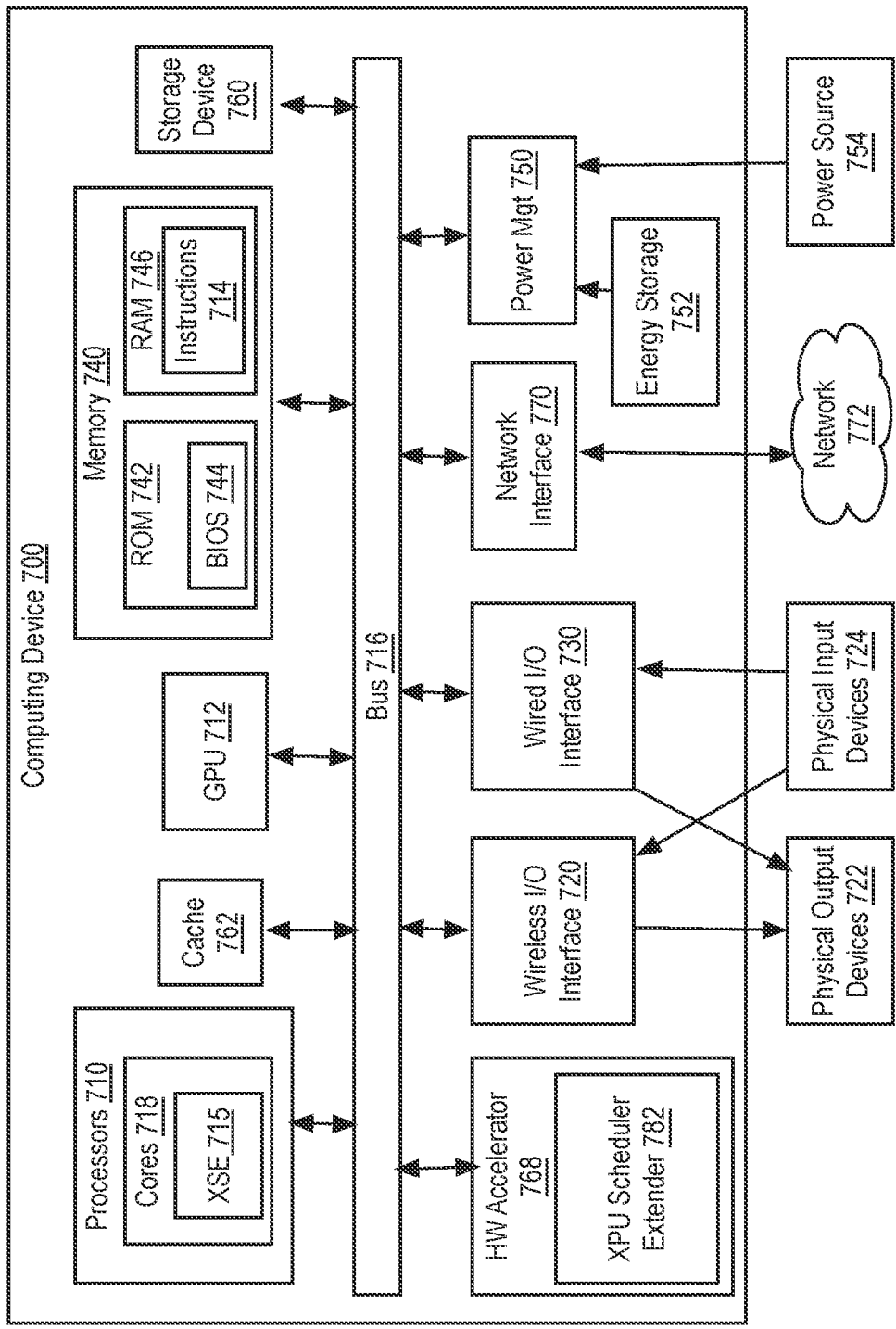
FIG. 7 is a schematic diagram of an illustrative electronic computing device to enable metrics and security-based accelerator service rescheduling and auto-scaling using a programmable network device, according to some embodiments.

FIG. 7 is a schematic diagram of an illustrative electronic computing device 700 to enable metrics and security-based accelerator service rescheduling and auto-scaling using a programmable network device, according to some embodiments. In some embodiments, the computing device 700 includes one or more processors 710 including one or more processors cores 718 including an XPU scheduler extender (XSE) 715, such as XPU scheduler extender 110-140 described with respect to FIGS. 1 and 2, scheduler extender 317 described with respect to FIG. 3, or XPU scheduler extender 416 described with respect to FIG. 4. In some embodiments, the computing device 700 includes a hardware accelerator 768, the hardware accelerator including an XPU scheduler extender 782, such as XPU scheduler extender 110-140 described with respect to FIGS. 1 and 2, scheduler extender 317 described with respect to FIG. 3, or XPU scheduler extender 416 described with respect to FIG. 4. In some embodiments, the computing device is to provide metrics and security-based accelerator service rescheduling and auto-scaling using a programmable network device, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, system memory 740 (e.g., memory circuitry), power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: one or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks are not described in further detail herein, as they should be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("Fire-Wire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

The following examples pertain to further embodiments. Example 1 is an apparatus to facilitate metrics and security-based accelerator service rescheduling and auto-scaling using a programmable network device. The apparatus of Example 1 comprises one or more processors to: collect metrics corresponding to communication links between microservices of a service managed by a service mesh; determine, based on analysis of the metrics, that a workload of the service can be accelerated by offload to a hardware accelerator device; generate a scaling request to cause the hardware accelerator device to be allocated to a cluster of hardware devices configured for the service; cause the scaling request to be transmitted to a programmable network device managing the hardware accelerator device, the programmable network device to allocate the hardware accelerator device to the cluster and to register the hardware accelerator device with the service mesh; and schedule the workload of the service to the hardware accelerator device.

In Example 2, the subject matter of Example 1 can optionally include wherein the metrics comprise telemetry data comprising at least one of a number of new transport layer security (TLS) connections, a number of transferred bytes per second, traffic patterns between the microservices, or utilization rate of hardware devices of the cluster.

In Example 3, the subject matter of any one of Examples 1-2 can optionally include wherein the one or processors to identify that the workload can be accelerated further comprises the one or more processors to annotate the service to indicate that the service is a candidate for scheduling in the hardware accelerator device, and wherein the annotation to cause a control plane scheduler of the service mesh to schedule the service to the hardware accelerator device. In Example 4, the subject matter of any one of Examples 1-3 can optionally include wherein the one or more processors to determine, based on the analysis of the metrics, that the workload can be accelerated by offload to the hardware accelerator device of a determined type comprising at least one of a graphics processing unit (GPU), a field programmable gate array (FPGA), an application-specific integrated circuit (ASIC), a cryptographic accelerator device, an inference accelerator device, or a compression accelerator device.

In Example 5, the subject matter of any one of Examples 1-4 can optionally include wherein the scaling request is communicated to a central resource orchestrator of a datacenter hosting the one or more processors and the hardware accelerator device, the central resource orchestrator managing a set of hardware resources in a datacenter hosting at least the one or more processors, the programmable network device, and the hardware accelerator device.

In Example 6, the subject matter of any one of Examples 1-5 can optionally include wherein the one or more processors comprise scheduler extender circuitry to expand operations of a control plane scheduler of the service mesh, and wherein the control plane scheduler to schedule workloads of the service on one or more available hardware resources in a datacenter, the one or more available hardware resources comprising at least the hardware accelerator device. In Example 7, the subject matter of any one of Examples 1-6 can optionally include wherein the one or more processors further to authenticate the hardware accelerator device as part of allocating the hardware accelerator device to the cluster.

In Example 8, the subject matter of any one of Examples 1-7 can optionally include wherein the one or more processors further to establish a shared secret key for the hardware accelerator device to utilize for secure communications between the hardware accelerator device and a control plane scheduler of the service mesh that schedules workloads to the hardware accelerator device. In Example 9, the subject matter of any one of Examples 1-8 can optionally include wherein the one or processors to execute a scheduler extender inside of a trusted execution environment (TEE) to isolate the scheduler extender, and wherein the scheduler extender to perform the collecting, the determining, the generating, and the causing.

In Example 10, the subject matter of any one of Examples 1-9 can optionally include wherein the one or processors to identify the hardware accelerator based on past performance history of the hardware accelerator, environmental conditions of the hardware accelerator, or service level agreements (SLAs) corresponding to the service the hardware accelerator. In Example 11, the subject matter of any one of Examples 1-10 can optionally include wherein the one or more processors further to communicate with a cluster node agent executing on the programmable network device, the cluster node agent to configure bandwidth on one or more hardware resources of the cluster based on the scaling request.

In Example 12, the subject matter of any one of Examples 1-11 can optionally include wherein the programmable network device and the hardware accelerator device are disaggregated from the one or more processors in a separate server device in a datacenter hosting the one or more processors, the programmable network device, and the hardware accelerator device. In Example 13, the subject matter of any one of Examples 1-12 can optionally include wherein the programmable network device comprises at least one of an infrastructure processing unit (IPU) or a data processing unit (DPU).

Example 14 is a non-transitory computer-readable storage medium for facilitating metrics and security-based accelerator service rescheduling and auto-scaling using a programmable network device. The non-transitory computer-readable storage medium of Example 14 having stored thereon executable computer program instructions that, when executed by one or more processors, cause the one or more processors to perform operations comprising: collecting, by the one or more processors, metrics corresponding to communication links between microservices of a service managed by a service mesh; determining, based on analysis of the metrics, that a workload of the service can be accelerated by offload to a hardware accelerator device; generating a scaling request to cause the hardware accelerator device to be allocated to a cluster of hardware devices configured for the service; causing the scaling request to be transmitted to a programmable network device managing the hardware accelerator device, the programmable network device to allocate the hardware accelerator device to the cluster and to register the hardware accelerator device with the service mesh; and scheduling the workload of the service to the hardware accelerator device.

In Example 15, the subject matter of Example 14 can optionally include wherein the scaling request is communicated to a central resource orchestrator of a datacenter hosting the one or more processors and the hardware accelerator device, the central resource orchestrator managing a set of hardware resources in a datacenter hosting at least the one or more processors, the programmable network device, and the hardware accelerator device. In Example 16, the subject matter of Examples 14-15 can optionally include wherein the operations further comprise authenticating the hardware accelerator device as part of allocating the hardware accelerator device to the cluster.

In Example 17, the subject matter of Examples 14-16 can optionally include wherein the operations further comprise establishing a shared secret key for the hardware accelerator device to utilize for secure communications between the hardware accelerator device and a control plane scheduler of the service mesh that schedules workloads to the hardware accelerator device.

Example 18 is a method for facilitating metrics and security-based accelerator service rescheduling and auto-scaling using a programmable network device. The method of Example 18 can include collecting, by one or more processors, metrics corresponding to communication links between microservices of a service managed by a service mesh; determining, based on analysis of the metrics by the one or more processors, that a workload of the service can be accelerated by offload to a hardware accelerator device;

generating, by the one or more processors, a scaling request to cause the hardware accelerator device to be allocated to a cluster of hardware devices configured for the service; causing, by the one or more processors, the scaling request to be transmitted to a programmable network device managing the hardware accelerator device, the programmable network device to allocate the hardware accelerator device to the cluster and to register the hardware accelerator device with the service mesh; and scheduling, by the one or more processors, the workload of the service to the hardware accelerator device.

In Example 19, the subject matter of Example 18 can optionally include wherein the scaling request is communicated to a central resource orchestrator of a datacenter hosting the one or more processors and the hardware accelerator device, the central resource orchestrator managing a set of hardware resources in a datacenter hosting at least the one or more processors, the programmable network device, and the hardware accelerator device. In Example 20, the subject matter of Examples 18-19 can optionally include further comprising communicating with a cluster node agent executing on the programmable network device, the cluster node agent to configure bandwidth on one or more hardware resources of the cluster based on the scaling request.

Example 21 is a system for facilitating metrics and security-based accelerator service rescheduling and auto-scaling using a programmable network device. The system of Example 21 can optionally include a memory to store a block of data, and a processor communicably coupled to the memory to: collect metrics corresponding to communication links between microservices of a service managed by a service mesh; determine, based on analysis of the metrics, that a workload of the service can be accelerated by offload to a hardware accelerator device; generate a scaling request to cause the hardware accelerator device to be allocated to a cluster of hardware devices configured for the service; cause the scaling request to be transmitted to a programmable network device managing the hardware accelerator device, the programmable network device to allocate the hardware accelerator device to the cluster and to register the hardware accelerator device with the service mesh; and schedule the workload of the service to the hardware accelerator device.

In Example 22, the subject matter of Example 21 can optionally include wherein the metrics comprise telemetry data comprising at least one of a number of new transport layer security (TLS) connections, a number of transferred bytes per second, traffic patterns between the microservices, or utilization rate of hardware devices of the cluster.

In Example 23, the subject matter of any one of Examples 21-22 can optionally include wherein the one or processors to identify that the workload can be accelerated further comprises the one or more processors to annotate the service to indicate that the service is a candidate for scheduling in the hardware accelerator device, and wherein the annotation to cause a control plane scheduler of the service mesh to schedule the service to the hardware accelerator device. In Example 24, the subject matter of any one of Examples 21-23 can optionally include wherein the one or more processors to determine, based on the analysis of the metrics, that the workload can be accelerated by offload to the hardware accelerator device of a determined type comprising at least one of a graphics processing unit (GPU), a field programmable gate array (FPGA), an application-specific integrated circuit (ASIC), a cryptographic accelerator device, an inference accelerator device, or a compression accelerator device.

In Example 25, the subject matter of any one of Examples 21-24 can optionally include wherein the scaling request is communicated to a central resource orchestrator of a datacenter hosting the one or more processors and the hardware accelerator device, the central resource orchestrator managing a set of hardware resources in a datacenter hosting at least the one or more processors, the programmable network device, and the hardware accelerator device.

In Example 26, the subject matter of any one of Examples 21-25 can optionally include wherein the one or more processors further to expand operations of a control plane scheduler of the service mesh, and wherein the control plane scheduler to schedule workloads of the service on one or more available hardware resources in a datacenter, the one or more available hardware resources comprising at least the hardware accelerator device. In Example 27, the subject matter of any one of Examples 21-26 can optionally include wherein the one or more processors further to authenticate the hardware accelerator device as part of allocating the hardware accelerator device to the cluster.

In Example 28, the subject matter of any one of Examples 21-27 can optionally include wherein the one or more processors further to establish a shared secret key for the hardware accelerator device to utilize for secure communications between the hardware accelerator device and a control plane scheduler of the service mesh that schedules workloads to the hardware accelerator device. In Example 29, the subject matter of any one of Examples 21-28 can optionally include wherein the one or processors to execute a scheduler extender inside of a trusted execution environment (TEE) to isolate the scheduler extender, and wherein the scheduler extender to perform the collecting, the determining, the generating, and the causing.

In Example 30, the subject matter of any one of Examples 21-29 can optionally include wherein the one or processors to identify the hardware accelerator based on past performance history of the hardware accelerator, environmental conditions of the hardware accelerator, or service level agreements (SLAs) corresponding to the service the hardware accelerator. In Example 31, the subject matter of any one of Examples 21-30 can optionally include wherein the one or more processors further to communicate with a cluster node agent executing on the programmable network device, the cluster node agent to configure bandwidth on one or more hardware resources of the cluster based on the scaling request.

In Example 32, the subject matter of any one of Examples 21-31 can optionally include wherein the programmable network device and the hardware accelerator device are disaggregated from the one or more processors in a separate server device in a datacenter hosting the one or more processors, the programmable network device, and the hardware accelerator device. In Example 33, the subject matter of any one of Examples 21-32 can optionally include wherein the programmable network device comprises at least one of an infrastructure processing unit (IPU) or a data processing unit (DPU).

Example 34 is an apparatus for facilitating metrics and security-based accelerator service rescheduling and auto-scaling using a programmable network device, comprising means for collecting metrics corresponding to communication links between microservices of a service managed by a service mesh; means for determining, based on analysis of the metrics, that a workload of the service can be accelerated by offload to a hardware accelerator device; means for generating a scaling request to cause the hardware accelerator device to be allocated to a cluster of hardware devices configured for the service; means for causing the scaling request to be transmitted to a programmable network device managing the hardware accelerator device, the programmable network device to allocate the hardware accelerator device to the cluster and to register the hardware accelerator device with the service mesh; and means for scheduling the workload of the service to the hardware accelerator device. In Example 35, the subject matter of Example 34 can optionally include the apparatus further configured to perform the method of any one of the Examples 19 to 20.

Example 36 is at least one machine readable medium comprising a plurality of instructions that in response to being executed on a computing device, cause the computing device to carry out a method according to any one of Examples 18-20. Example 37 is an apparatus for facilitating metrics and security-based accelerator service rescheduling and auto-scaling using a programmable network device, configured to perform the method of any one of Examples 18-20. Example 38 is an apparatus for facilitating metrics and security-based accelerator service rescheduling and auto-scaling using a programmable network device, comprising means for performing the method of any one of Examples 18 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
   one or more processor hardware devices comprising:
      a control plane scheduler of a service mesh that is to manage microservices of a service and is to schedule workloads of the service on one or more hardware resources in a datacenter comprising the one or more processor hardware devices; and
      a scheduler extender communicably coupled to the control plane scheduler, the scheduler extender executed inside of a trusted execution environment (TEE) to isolate the scheduler extender, and wherein the scheduler extender further comprises:
         a metric analyzer to:
            analyze telemetry data corresponding to communication links between the microservices of the service managed by the service mesh;
            determine, based on analysis of the telemetry data, that a workload of the service can be accelerated by offload to a hardware accelerator device of the one or more hardware resources in the datacenter; and
            identify, based on the analysis of the telemetry data, a type of the hardware accelerator device to receive the offload of the workload of the service; and
         a resource allocator communicably coupled to the metric analyzer, the resource allocator to:
            generate a scaling request to cause the hardware accelerator device corresponding to the type to be allocated to a cluster of hardware devices of the one or more hardware resources configured for the service;
            transmit the scaling request to a programmable network device managing the hardware accelerator device, the programmable network device to allocate the hardware accelerator device to the cluster and to register the hardware accelerator device with the service mesh; and
            schedule the workload of the service to the hardware accelerator device.

2. The apparatus of claim 1, wherein the telemetry data comprising at least one of a number of new transport layer security (TLS) connections, a number of transferred bytes per second, traffic patterns between the microservices, or utilization rate of hardware devices of the cluster.

3. The apparatus of claim 1, wherein the one or more processor hardware devices are to identify that the workload can be accelerated further comprises the one or more processor hardware devices to annotate the service to indicate that the service is a candidate for scheduling in the hardware accelerator device, and wherein annotating the service is to cause the control plane scheduler of the service mesh to schedule the service to the hardware accelerator device.

4. The apparatus of claim 1, wherein the type of the hardware accelerator device comprises at least one of a graphics processing unit (GPU), a field programmable gate array (FPGA), an application-specific integrated circuit (ASIC), a cryptographic accelerator device, an inference accelerator device, or a compression accelerator device.

5. The apparatus of claim 1, wherein the scaling request is communicated to a central resource orchestrator of the datacenter hosting the one or more processor hardware devices and the hardware accelerator device, the central resource orchestrator managing a set of hardware resources in the datacenter hosting at least the one or more processor hardware devices, the programmable network device, and the hardware accelerator device.

6. The apparatus of claim 1, wherein the one or more processor hardware devices are further to authenticate the hardware accelerator device as part of allocating the hardware accelerator device to the cluster.

7. The apparatus of claim 6, wherein the one or more processor hardware devices are further to establish a shared secret key for the hardware accelerator device to utilize for secure communications between the hardware accelerator device and the control plane scheduler of the service mesh that schedules the workloads to the hardware accelerator device.

8. The apparatus of claim 1, wherein the one or more processor hardware devices are to identify the hardware accelerator device based on past performance history of the hardware accelerator device, environmental conditions of the hardware accelerator device, or service level agreements (SLAs) corresponding to the service of the hardware accelerator device.

9. The apparatus of claim 1, wherein the one or more processor hardware devices are further to communicate with a cluster node agent executing on the programmable network device, the cluster node agent to configure bandwidth on the one or more hardware resources of the cluster based on the scaling request.

10. The apparatus of claim 1, wherein the programmable network device and the hardware accelerator device are disaggregated from the one or more processor hardware devices in a separate server device in the datacenter hosting the one or more processor hardware devices, the programmable network device, and the hardware accelerator device.

11. The apparatus of claim 1, wherein the programmable network device comprises at least one of an infrastructure processing unit (IPU) or a data processing unit (DPU).

12. A non-transitory computer-readable storage medium having stored thereon executable computer program instructions that, when executed by a control plane scheduler of a service mesh that is to manage microservices of a service and is to schedule workloads of the service on one or more hardware resources in a datacenter comprising one or more processor hardware devices; and a scheduler extender communicably coupled to the control plane scheduler, the scheduler extender executed inside of a trusted execution environment (TEE) to isolate the scheduler extender, and wherein the scheduler extender further comprises a metric analyzer and a resource allocator, to cause performance of operations comprising:

- scheduling, by the one or more processor hardware devices hosting the control plane scheduler, the workloads of the service on one or more hardware resources in the datacenter comprising the one or more processor hardware devices;
- analyzing, by the metric analyzer of the scheduler extender, telemetry data corresponding to communication links between the microservices of the service;
- determining, by the metric analyzer based on analysis of the telemetry data, that a workload of the service can be accelerated by offload to a hardware accelerator device of the one or more hardware resources in the datacenter;
- identifying, by the metric analyzer based on the analysis of the telemetry data, a type of the hardware accelerator device to receive the offload of the workload of the service;
- generating, by the resource allocator of the scheduler extender communicably coupled to the metric analyzer, a scaling request to cause the hardware accelerator device corresponding to the type to be allocated to a cluster of hardware devices of the one or more hardware resources configured for the service;
- transmitting, by the resource allocator, the scaling request to a programmable network device managing the hardware accelerator device, the programmable network device to allocate the hardware accelerator device to the cluster and to register the hardware accelerator device with the service mesh; and
- scheduling, by the resource allocator, the workload of the service to the hardware accelerator device.

13. The non-transitory computer-readable storage medium of claim 12, wherein the scaling request is communicated to a central resource orchestrator of the datacenter hosting the one or more processor hardware devices and the hardware accelerator device, the central resource orchestrator managing the one or more hardware resources in the datacenter hosting at least the one or more processor hardware devices, the programmable network device, and the hardware accelerator device.

14. The non-transitory computer-readable storage medium of claim 12, wherein the operations further comprise authenticating the hardware accelerator device as part of allocating the hardware accelerator device to the cluster.

15. The non-transitory computer-readable storage medium of claim 14, wherein the operations further comprise establishing a shared secret key for the hardware accelerator device to utilize for secure communications between the hardware accelerator device and the control plane scheduler of the service mesh.

16. A method performed by a control plane scheduler of a service mesh that is to manage microservices of a service and is to schedule workloads of the service on one or more hardware resources in a datacenter comprising one or more processor hardware devices; and a scheduler extender communicably coupled to the control plane scheduler, the scheduler extender executed inside of a trusted execution environment (TEE) to isolate the scheduler extender, and wherein the scheduler extender further comprises a metric analyzer and a resource allocator, comprising:

- scheduling, by the one or more processor hardware devices, the workloads of the service on one or more hardware resources in the datacenter;
- analyzing, by the metric analyzer of the scheduler extender, telemetry data corresponding to communication links between the microservices of the service;
- determining, by the metric analyzer based on analysis of the telemetry data, that a workload of the service can be accelerated by offload to a hardware accelerator device of the one or more hardware resources in the datacenter;
- identifying, by the metric analyzer based on the analysis of the telemetry data, a type of the hardware accelerator device to receive the offload of the workload of the service;
- generating, by the resource allocator of the scheduler extender communicably coupled to the metric analyzer, a scaling request to cause the hardware accelerator device corresponding to the type to be allocated to a cluster of hardware devices of the one or more hardware resources configured for the service;
- transmitting, by the resource allocator, the scaling request to a programmable network device managing the hardware accelerator device, the programmable network device to allocate the hardware accelerator device to the cluster and to register the hardware accelerator device with the service mesh; and
- scheduling, by the resource allocator, the workload of the service to the hardware accelerator device.

17. The method of claim 16, wherein the scaling request is communicated to a central resource orchestrator of the datacenter hosting the one or more processor hardware devices and the hardware accelerator device, the central resource orchestrator managing the one or more hardware resources in the datacenter hosting at least the one or more processor hardware devices, the programmable network device, and the hardware accelerator device.

18. The method of claim 16, wherein the scheduler extender to communicate with a cluster node agent executing on the programmable network device, the cluster node agent to configure bandwidth on the one or more hardware resources of the cluster based on the scaling request.

19. The method of claim 16, further comprising authenticating the hardware accelerator device as part of allocating the hardware accelerator device to the cluster.

* * * * *